US007742269B2

(12) United States Patent
Shinohara

(10) Patent No.: US 7,742,269 B2
(45) Date of Patent: Jun. 22, 2010

(54) CIRCUIT BREAKER

(75) Inventor: Toshiaki Shinohara, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 404 days.

(21) Appl. No.: 11/697,445

(22) Filed: Apr. 6, 2007

(65) Prior Publication Data

US 2007/0289948 A1 Dec. 20, 2007

(30) Foreign Application Priority Data

Jun. 19, 2006 (JP) .............................. 2006-168750
Nov. 9, 2006 (JP) .............................. 2006-303693

(51) Int. Cl.
*H02H 5/04* (2006.01)

(52) U.S. Cl. ........................... 361/103; 219/517; 337/4; 337/17; 337/168; 337/171; 337/174; 337/176; 337/178; 337/182

(58) Field of Classification Search ................. 361/103, 361/104, 106; 337/171, 174, 178, 182, 4, 337/17, 168, 176; 219/517
See application file for complete search history.

(56) References Cited

U.S. PATENT DOCUMENTS 5,084,691 A * 1/1992 Lester et al. ................ 337/297
5,614,440 A * 3/1997 Bezama et al. .............. 438/467
5,831,507 A * 11/1998 Kasamatsu et al. ............. 337/4
6,157,288 A * 12/2000 Yamaguchi ................. 337/405
6,281,782 B1 8/2001 Morimoto et al.
6,940,052 B2 * 9/2005 Block et al. ................. 219/517
7,088,216 B2 * 8/2006 Furuuchi .................... 337/183

FOREIGN PATENT DOCUMENTS

JP 58127581 A * 7/1983
JP 63-185002 7/1988
JP 6-119858 4/1994
JP 7-153367 6/1995
JP 10-261353 9/1998
JP 2000-149744 5/2000
JP 2003-68967 3/2003
JP 2004-214032 7/2004
JP 2005-175439 6/2005

OTHER PUBLICATIONS

Abstract for JP 58127581. Jul. 29, 1983.*

* cited by examiner

*Primary Examiner*—Jared J Fureman
*Assistant Examiner*—Christopher J Clark
(74) *Attorney, Agent, or Firm*—Oblon, Spivak, McClelland, Maier & Neustadt, L.L.P.

(57) ABSTRACT

The circuit breaker according to the present invention has first and second terminals having favorable electric conductivity and joined to each other with solder; and a heater whose circumference is insulated installed for melting the solder and supplied with electric power from the current path separate from current paths passing through the first and second terminals; wherein the first and second terminals are separated by a spring force and insulated when the solder is melted.

3 Claims, 6 Drawing Sheets

CIRCUIT BREAKER

BACKGROUND OF THE INVENTION

1. Field of the Invention

The present invention relates to a circuit breaker used in a power semiconductor device, such as an inverter that passes large current, and specifically to a small and low-cost circuit breaker that can reliably break a circuit regardless of operating conditions, and has a small wiring loss.

2. Background Art

There is a case wherein an element of an inverter for driving a motor installed in a hybrid motor vehicle or the like is broken to be a short-circuited state, and regenerative current flows back from a motor rotated by an engine power. In order to prevent the flow of a large current into the circuit in such abnormality, a circuit breaker has been used. As a circuit breaker, a device wherein a fuse is broken by the heat of a heater has been proposed (see, for example, Japanese Patent Laid-Open No. 6-119858).

In a conventional circuit breaker, a heater was serially inserted in a current path, and a fuse was broken when a larger current than in normal operation flows in abnormality. However, in the case of a hybrid vehicle or the like, since there was no significant difference in the current value for driving a motor in normal operation and the regenerative current value from the motor in abnormality, the fuse cannot be reliably broken. In addition, since an electric resistor serially inserted in a current path was used as the heater, there was a problem of large wiring loss. If the fuse was substituted by a relay, although the circuit was reliably broken, there were problems of contact resistance, costs, and a space.

SUMMARY OF THE INVENTION

To solve problems as described above, it is an object of the present invention to provide a small and low-cost circuit breaker that can reliably break a circuit regardless of operating conditions, and has a small wiring loss.

The circuit breaker according to the present invention has first and second terminals having favorable electric conductivity and joined to each other with solder; and a heater whose circumference is insulated installed for melting the solder and supplied with electric power from the current path separate from current paths passing through the first and second terminals; wherein the first and second terminals are separated by a spring force and insulated when the solder is melted.

According to the present invention, a small and low-cost circuit breaker that can reliably break a circuit regardless of operating conditions, and has a small wiring loss can be obtained.

Other and further objects, features and advantages of the invention will appear more fully from the following description.

DETAILED DESCRIPTION OF THE PREFERRED EMBODIMENTS

First Embodiment

Figure 1:
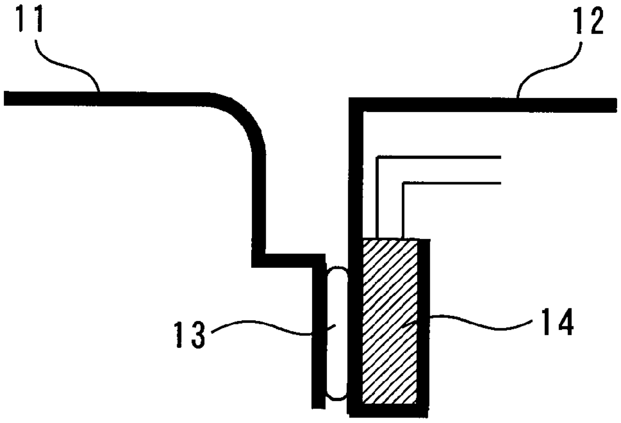
FIG. 1 is a plan view showing a circuit breaker according to the first embodiment of the present invention.

FIG. 1 is a plan view showing a circuit breaker according to the first embodiment of the present invention. This circuit breaker is used in a power semiconductor device, such as an inverter that passes large current.

As FIG. 1 shows, a first terminal 11 and a second terminal 12 having favorable electric conductivity, such as copper, are joined to each other with a solder 13. For melting the solder 13, a heater 14 is installed on the back face of the end portion of the second terminal 12. Here, the end portion of the second terminal 12 is bent in a U-shape, and the heater 14 is installed in the U-shaped portion. Thereby heat from the heater 14 can be efficiently supplied to the solder 13, and the heater 14 can be easily fixed. The circumference of the heater 14 is insulated with ceramics or the like.

Figure 2:
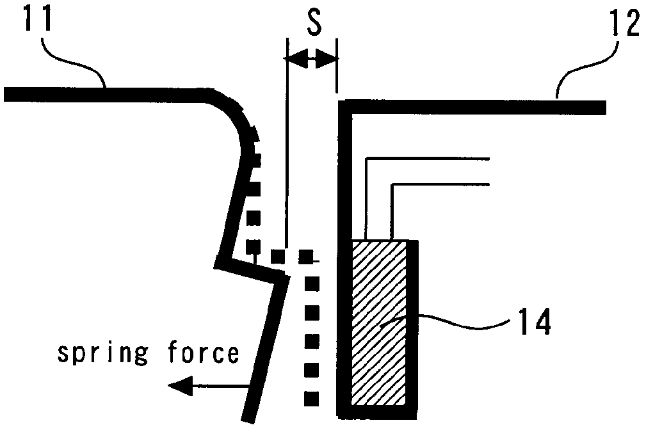
FIG. 2 is a top view for explaining an operation of a circuit breaker according to the first embodiment of the present invention.

In the state not joined by solder 13, the first terminal 11 and the second terminal 12 are as shown in FIG. 2. The first terminal 11 has a shape having spring characteristics, and is formed by a copper alloy or the like. The shape of the first terminal 11 is designed so that a gap S is produced between the first terminal 11 and the second terminal 12 in the state not joined by solder 13. On the other hand, in the state joined by solder 13, the first terminal 11 is deformed within the range of the action of the spring. However, to secure reliability, the spring force using the spring characteristics of the first terminal 11 is set to be a force not exceeding the fatigue limit of the solder 13 when not heated.

Next, the operation of the circuit breaker according to the first embodiment will be described. First, in a normal operation, as FIG. 1 shows, the first terminal 11 and the second terminal 12 are joined to each other with the solder 13. Next, when there is abnormality in the power semiconductor device, electric power is supplied to the heater 14, and the solder 13 is melted. Then, as FIG. 2 shows, by the spring force using the spring characteristics of the first terminal 11, the first terminal 11 is electrically separated from the second terminal 12 by the gap S, and the circuit is broken.

The heater 14 is supplied with electric power from a current path separate from the current paths passing through the first terminal 11 and the second terminal 12. Therefore, the circuit can be broken regardless of operating conditions. Compared with the conventional circuit breaker using an electric resistor serially inserted in a current path as a heater, the wiring loss of the circuit breaker according to the first embodiment is smaller. A circuit breaker according to the second embodiment of the present invention can be realized by a small and low-cost structure.

In the above-described example, although the heater 14 is installed on one of the first terminal 11 and the second terminal 12, heaters can be installed on both the first terminal 11 and the second terminal 12. Also in the above-described example, although the spring characteristics of either one of the first terminal 11 or the second terminal 12 are used as the spring force, the spring characteristics of the first terminal 11 and the second terminal 12 can also be used.

Second Embodiment

Figure 3:
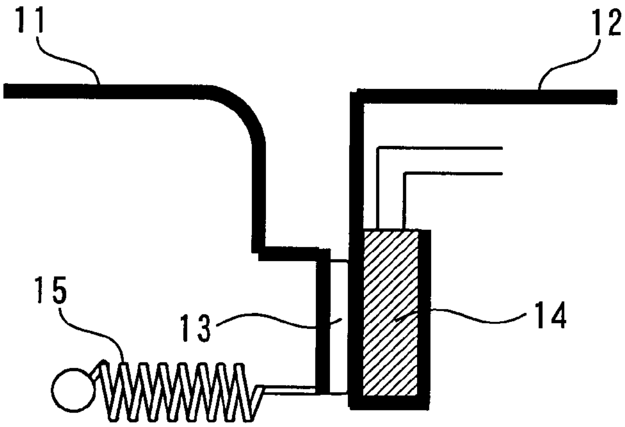
FIG. 3 is a plan view showing a circuit breaker according to the second embodiment of the present invention.

FIG. 3 is a plan view showing a circuit breaker according to the second embodiment of the present invention. In the first embodiment, although the first terminal 11 is separated from the second terminal 12 by the spring force using the spring characteristics of the first terminal 11, in the second embodiment, the spring force is obtained from a spring material 15 other than the first terminal 11 and the second terminal 12. Thereby, without imparting the spring characteristics to the first terminal 11 and the second terminal 12, an effect similar to the effect of the first embodiment can be exerted.

Third Embodiment

Figure 4:
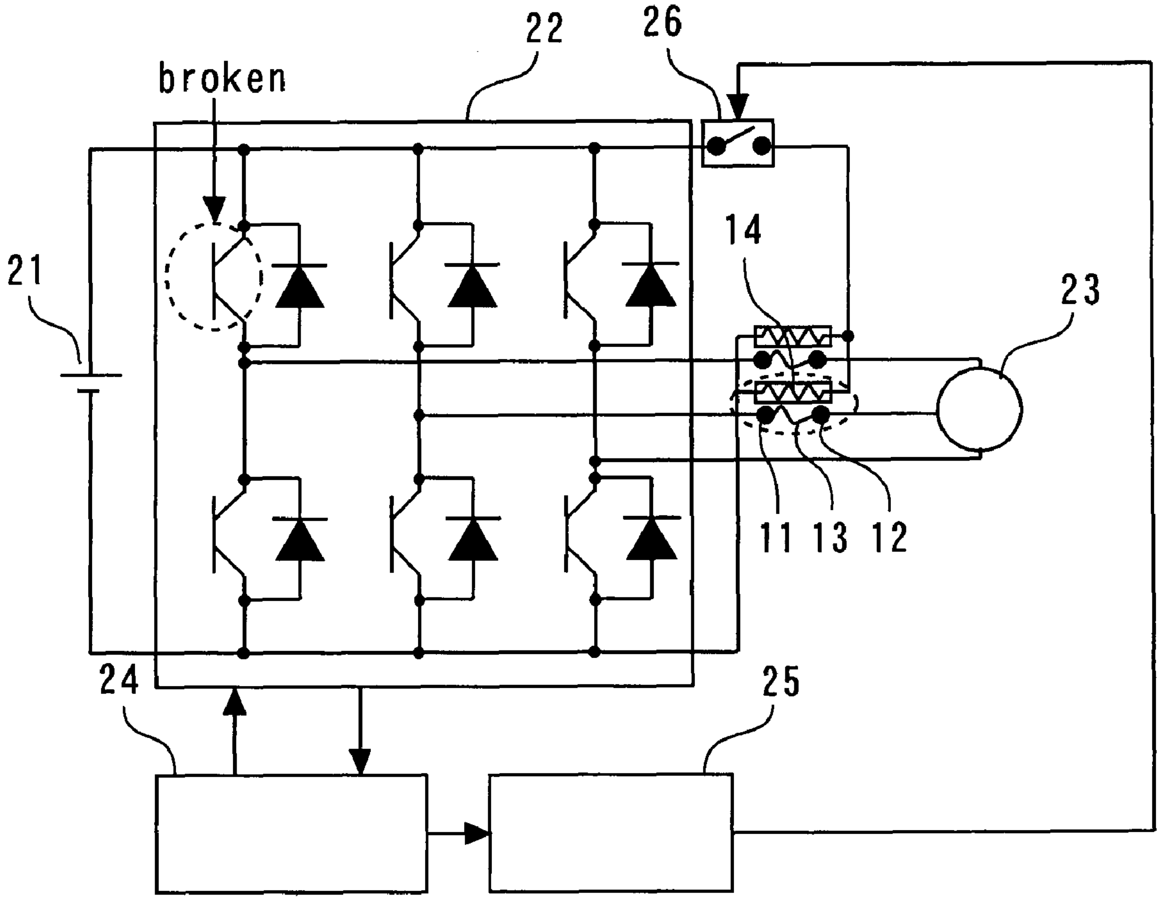
FIG. 4 is a circuit diagram showing a power semiconductor device according to the third embodiment of the present invention.

FIG. 4 is a circuit diagram showing a power semiconductor device according to the third embodiment of the present invention. This power semiconductor device has a circuit to invert the current from the battery power source 21 into AC using an inverter circuit 22, and to drive a three-phase motor 23. It has also an inverter control circuit 24 to control the inverter circuit 22, a breaking control circuit 25, a switch 26, and a circuit breaker similar to the circuit breaker of the first or second embodiment. The first terminal 11 and the second terminal 12 are connected to the three-phase motor 23 and the inverter circuit 22 to drive the three-phase motor 23, respectively.

When the inverter control circuit 24 detects the abnormality of the inverter circuit 22, it transmits signals to the breaking control circuit 25, and upon the receipt of the signals, the breaking control circuit 25 outputs ON signal to the switch 26. When the ON signal from the breaking control circuit 25 is inputted to the switch 26, it supplies electric power from the battery power source 21 to the heater 14. Thereby, the solder 13 is melted by the heat from the heater 14, the first terminal 11 is electrically separated from the second terminal 12, and the circuit is broken.

Thereafter, when the inverter control circuit 24 detects that the current no longer flows in the inverter circuit 22, the inverter control circuit 24 transmits a signal to the breaking control circuit 25, and the breaking control circuit 25 having received the signal outputs OFF signal to the switch 26. When the OFF signal is inputted in the switch 26 from the breaking control circuit 25, the switch 26 stops the supply of electric power from the battery power source 21 to the heater 14. Electric power can be supplied to the heater 14 from a power source other than the battery power source 21, and a semiconductor switch can be used as the switch 26.

Thereby, in a circuit to convert a current from the battery power source into AC by an inverter circuit to drive a three-phase motor, the effect similar to the effect of the first or second embodiment is exerted.

Obviously many modifications and variations of the present invention are possible in the light of the above teachings. It is therefore to be understood that within the scope of the appended claims the invention may be practiced otherwise than as specifically described.

Fourth Embodiment

Figure 5:
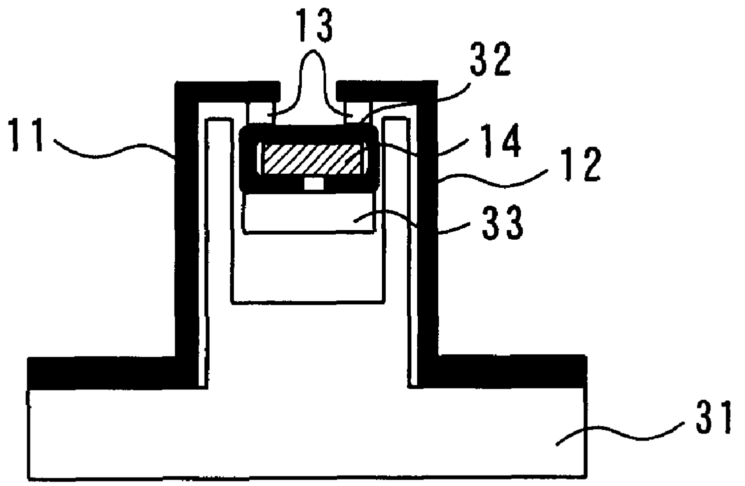
FIG. 5 is a sectional view showing a power semiconductor device according to the fourth embodiment of the present invention.

FIG. 5 is a sectional view showing a power semiconductor device according to the fourth embodiment of the present invention. As FIG. 5 shows, a first terminal 11 and a second terminal 12 having favorable electric conductivity, such as copper, are disposed apart from each other by a spatial distance for insulating on an insulator 31. Abridge 32 (metal conductor) formed by shaping a copper plate is joined to each of the first and second terminals 11 and 12 with a solder 13. To melt the solder 13, a heater 14 is provided so as to contact the bridge 32. Here, the heater 14 is fixed by shaping a part of the bridge 32. Thereby, heat from the heater 14 can be more effectively supplied to the solder 13, and the heater 14 can be easily fixed. The circumference of the heater 14 is also insulated with ceramics or the like. To the bridge 32, a weight 33 is fixed so as to impart force to securely separate from the solder 13 when it melts.

Next, the operation of the circuit breaker according to the fourth embodiment will be described. First, in a normal operation, as FIG. 5 shows, the first terminal 11 and the second terminal 12 are joined to each other with the bridge 32 and the solder 13. Next, when there is abnormality in the power semiconductor device, electric power is supplied to the heater 14, the bridge 32 is first heated, and the heat is transmitted to the solder 13. Here, while the thermal conductivity of copper is 395 W/mK, for example, the thermal conductivity of a solder consisting mainly of Sn is as low as 66 W/mK, and the solder functions as a sort of an insulator. Therefore, the temperature of the solder 13 that contacts the bridge 32 elevates, and the solder 13 is melted. The temperature of the bridge 32 reaches the temperature at which heat transmitted to the first and second terminals 11 and 12 balances with the calorific value of the heater 14 through the solder 13. Therefore, the capacity of the heater 14 is designed to be a capacity to reach the temperature at which the solder 13 melts.

Figure 6:
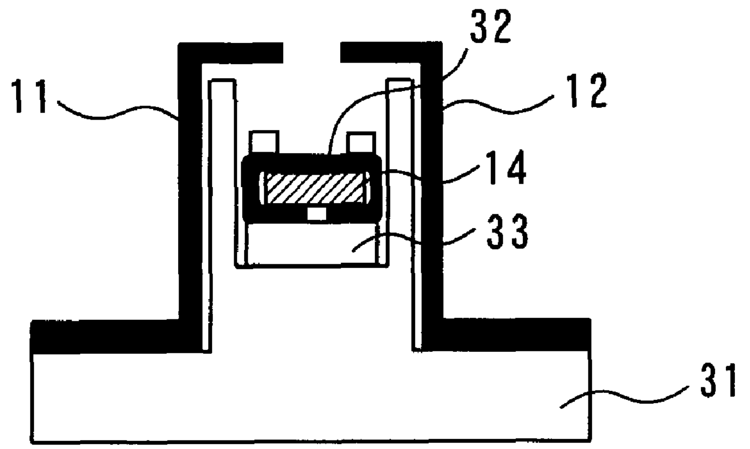
FIG. 6 is a sectional view showing a power semiconductor device according to the fourth embodiment of the present invention.

When the solder 13 is melted, as FIG. 6 shows, the bridge 32 falls from the first and second terminals 11 and 12 by the own weight or the weight 33 and is separated, and the first and second terminals 11 and 12 are divided by a predetermined spatial distance and electrically separated, and the circuit is broken. Since a stable force without change over time can be obtained by the impartation of the separating force utilizing gravity as long as the circuit breaker is used on the ground, and used right side up, the circuit can be securely broken. Also since stress to the solder 13 can be accurately controlled, reliable design is easy. By fixing the heater 14 on the bridge 32 side, heat transfer to the first and second terminals 11 and 12 can be suppressed when a part of the solder 13 is melted and separated, the temperature of the bridge 32 is elevated, and further, the melting of the solder 13 can be accelerated to ensure blowout.

Electric power is supplied to the heater 14 from a current path different from the current path passing through the first and second terminals 11 and 12. Therefore, the circuit can be securely broken regardless of operating conditions. In addition, wiring loss is slight compared with the circuit breaker wherein a resistor serially inserted in the current path is used as the heater 14 as in prior art. The circuit breaker according to the fourth embodiment can be realized by a small and low-cost structure.

Fifth Embodiment

Figure 7:
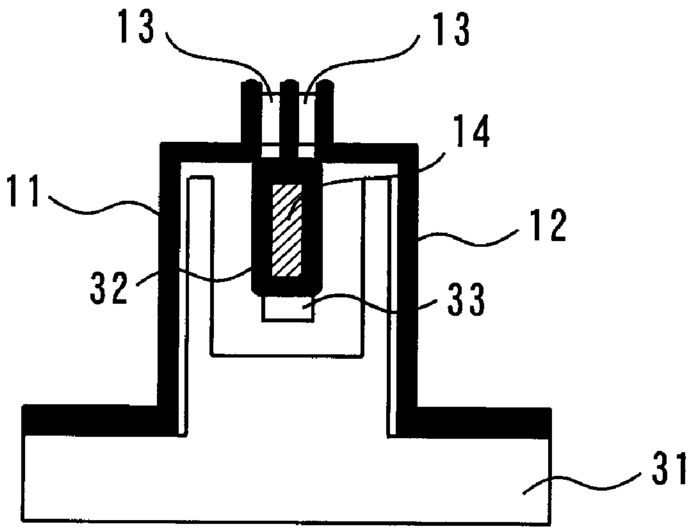
FIG. 7 is a sectional view showing a circuit breaker according to the fifth embodiment of the present invention.

FIG. 7 is a sectional view showing a circuit breaker according to the fifth embodiment of the present invention. In the fifth embodiment, a part of the bridge 32 is provided between the end portion of the first terminal 11 and the end portion of the second terminal 12. The heater 14 is disposed in the vertical direction. Thereby, the entire device can be thinned.

Sixth Embodiment

Figure 8:
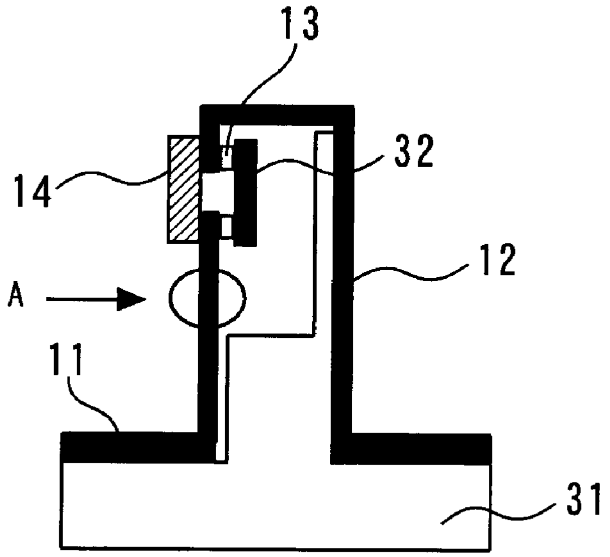
FIG. 8 is a sectional view showing a circuit breaker according to the sixth embodiment of the present invention.

FIG. 8 is a sectional view showing a circuit breaker according to the sixth embodiment of the present invention. In the sixth embodiment, the heater 14 is disposed so as to contact the opposite surface to the surface wherein the heater 14 for the first and second terminals 11 and 12 is joined with the solder 13. Thereby, the entire device can be thinned.

Figure 9:
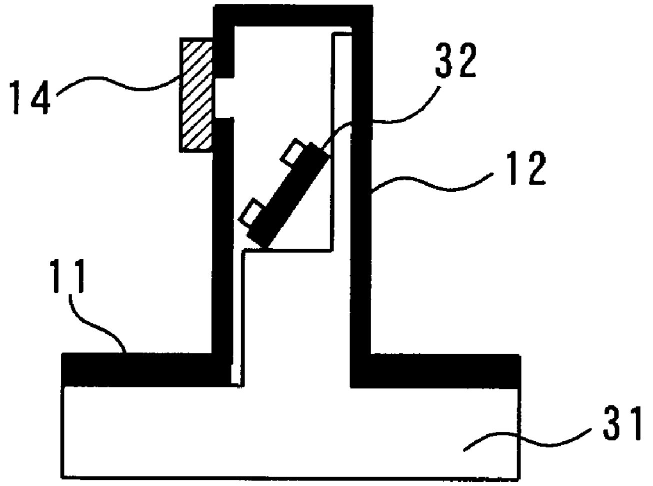
FIG. 9 is a sectional view showing a circuit breaker according to the sixth embodiment of the present invention.

When the solder 13 is melted, as FIG. 9 shows, the bridge 32 falls and separates from the first and second terminals 11 and 12 by the own weight thereof, the first terminal 11 is separated from the second terminal 12 by a predetermined spatial distance, and the circuit is broken. However, since the heater 14 directly contacts the first and second terminals 11 and 12, the heat is easily allowed to escape to the first and second terminals 11 and 12, and the temperature elevation of the first and second terminals 11 and 12 becomes gentle. Therefore, the temperature elevation of the solder 13 can be accelerated by suppressing the escape of heat by opening a hole in the A portion of the first terminal 11 or by narrowing the width of a portion. In the sixth embodiment, although the own weight of the bridge 32 is utilized as the separating force, a weight or a spring fixed to the bridge 32 can also be utilized as the separating force.

Seventh Embodiment

Figure 10:
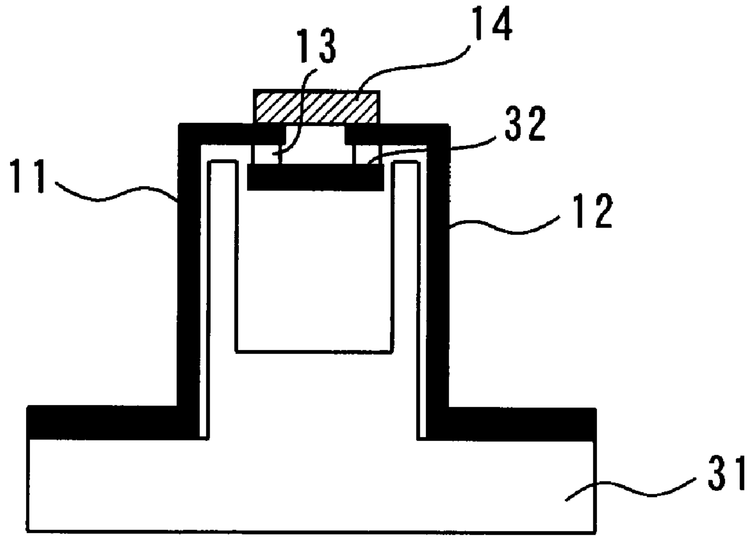
FIG. 10 is a sectional view showing a circuit breaker according to the seventh embodiment of the present invention.

FIG. 10 is a sectional view showing a circuit breaker according to the seventh embodiment of the present invention. In the seventh embodiment, the bridge 32 is provided in the lateral direction. Other configurations are the same as in the sixth embodiment, and the same effects can be obtained.

Eighth Embodiment

Figure 11:
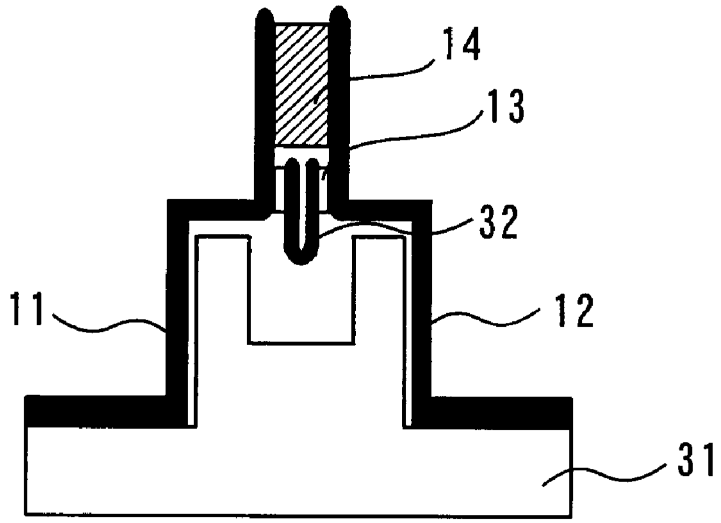
FIG. 11 is a sectional view showing a circuit breaker according to the eighth embodiment of the present invention.

FIG. 11 is a sectional view showing a circuit breaker according to the eighth embodiment of the present invention. In the eighth embodiment, the heater 14 is fixed by shaping a part of the first and second terminals 11 and 12. The bridge 32 is provided between the first and second terminals 11 and 12. Other configurations are the same as in the sixth embodiment, and the same effects can be obtained.

Ninth Embodiment

Figure 12:
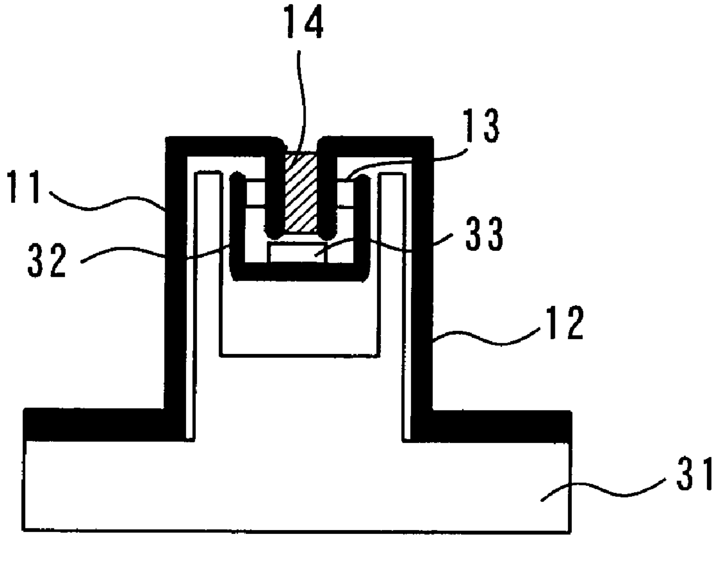
FIG. 12 is a sectional view showing a circuit breaker according to the ninth embodiment of the present invention.

FIG. 12 is a sectional view showing a circuit breaker according to the ninth embodiment of the present invention. In the ninth embodiment, the heater 14 is fixed by shaping a part of the first and second terminals 11 and 12. The bridge 32 is provided so as to pinch the first and second terminals 11 and 12. Other configurations are the same as in the sixth embodiment, and the same effects can be obtained.

The entire disclosure of a Japanese Patent Application No. 2006-168750, filed on Jun. 19, 2006 and a Japanese Patent Application No. 2006-303693, filed on Nov. 9, 2006 including specification, claims, drawings and summary, on which the Convention priority of the present application is based, are incorporated herein by reference in its entirety.

What is claimed is:

1. A circuit breaker comprising:

first and second terminals having favorable electric conductivity and disposed apart from each other by a spatial distance for electrically separating said first and second terminals;

a metal bridge connected to said respective first and second terminals with a solder;

a heater inserted into a shaped receiving portion of the metal bridge, the heater having a circumference that is insulated, the heater melting said solder and supplied with electric power from a current path different from current paths passing through said first and second terminals; wherein when said solder melts, said metal bridge is electrically separated from said first and second terminals, and said first and second terminals are electrically separated from each other.

2. The circuit breaker according to claim 1, wherein when said solder melts, said metal bridge is electrically separated from said first and second terminals by its own weight thereof, or a weight fixed to said metal bridge, and said first and second terminals are insulated electrically separated from each other.

3. The circuit breaker according to claim 1, wherein a part of said metal bridge is provided between the end portion of said first terminal and the end portion of said second terminal.

* * * * *